(12) United States Patent
Marinelli et al.

(10) Patent No.: US 7,370,323 B2
(45) Date of Patent: May 6, 2008

(54) METHOD AND SYSTEM FOR MANAGING CONFIGURATION CHANGES IN A DATA PROCESSING SYSTEM

(75) Inventors: Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/472,651

(22) PCT Filed: Mar. 5, 2002

(86) PCT No.: PCT/EP02/03363

§ 371 (c)(1),
(2), (4) Date: Sep. 23, 2003

(87) PCT Pub. No.: WO02/086696

PCT Pub. Date: Oct. 31, 2002

(65) Prior Publication Data

US 2004/0153869 A1    Aug. 5, 2004

(30) Foreign Application Priority Data

Apr. 19, 2001    (GB)    ................................ 0109618.9

(51) Int. Cl.
*G06F 9/44* (2006.01)
*G06F 15/177* (2006.01)
*G06F 15/173* (2006.01)

(52) U.S. Cl. ........................ 717/173; 709/221; 709/223
(58) Field of Classification Search ................ 717/173; 709/221, 223
See application file for complete search history.

(56) References Cited

U.S. PATENT DOCUMENTS

| 5,797,128 A | * | 8/1998 | Birnbaum ...................... 707/5 |
| 5,889,953 A | * | 3/1999 | Thebaut et al. ............. 709/221 |
| 6,678,888 B1 | | 1/2004 | Sakanishi |

OTHER PUBLICATIONS

T. Yokoyama, Introduction to Group Policy—Learning a setup procedure and management method of Group Policy Object, Windows 2000 World, IDG Japan, Jan. 2000, vol. 6, No. 1., pp. 167-174 (in Japanese).

(Continued)

*Primary Examiner*—Lewis A. Bullock, Jr.
*Assistant Examiner*—Loren Chauhan
(74) *Attorney, Agent, or Firm*—Duke W. Yee; Jeffrey S. LaBaw; Wayne P. Bailey

(57) ABSTRACT

A method of managing configuration changes in a data processing system, particularly a network wherein software products (250) must be distributed to client workstations. The method provides the definition of reference models (220e-220d) arranged in a tree (215); each reference model includes configuration elements (such as software products and/or hardware features and their desired target status) for the corresponding client workstations (subscribers). A target configuration (230) of the client workstations associated with each reference model is determined by inheriting the configuration elements of the parent reference models. A list of actions (245) to be carried out on each client workstation for reaching the corresponding target configuration is determined by comparing the target configuration with a current configuration of the client workstation stored in a corresponding inventory (245).

5 Claims, 4 Drawing Sheets

OTHER PUBLICATIONS

In Introduction to Tivoli's TIME 10, IBM Japan, Sep. 30, 1997, pp. 65-84.

Ansell J, et al., "An architecture for the design of TMN applications", Proceedings of the International Conference on Communication ICC) Geneva, May 23-26, 1993 NY, IEEE.

Hall R S, et al., "An architecture for post-development configuration management in a wide-area network", Distributed Computing Systems, 1997, Proceedings of the 17th International Conference on Baltimore, MD, May 27-30, 1997, Los Alamitos, CA, IEEE.

* cited by examiner

METHOD AND SYSTEM FOR MANAGING CONFIGURATION CHANGES IN A DATA PROCESSING SYSTEM

The present invention relates to a method and system for managing configuration changes in a data processing system.

Managing configuration changes in a data processing system is a time consuming activity, particularly when the system includes a great number of destination units on which new configurations must be enforced. A typical example is that of a large network with hundreds of workstations where software products and/or hardware features are periodically upgraded in order to be abreast of the information technology development.

Software distribution applications have been proposed in the last years to assist a system administrator in efficiently managing deployment of software products to (client) workstations. A software distribution application runs on a server workstation and controls building of packages including new software products (or new versions thereof) to be installed and instructions understandable by the client workstations. Each package is distributed to the respective client workstation through the network; the instructions embedded in the package cause the software products to be automatically installed or removed in order to reach the desired (software) configuration of the client workstation.

However, this solution is not completely satisfactory. Particularly, the administrator is faced with the burden of manually defining the packages to be distributed to the client workstations. Moreover, the administrator cannot rely on information provided by the software distribution application for deciding which software products must be installed and/or removed and on which client workstations the new configurations must be enforced. As a consequence, the process of managing the configuration changes is very complex and error-prone.

The drawbacks of the solutions known in the art are particularly acute in large systems, where different and frequent configuration changes are enforced on various destination units.

It is an object of the present invention to overcome the above-mentioned drawbacks. In order to achieve this object, a method as set out in the first claim is proposed.

Briefly, the present invention provides a method of managing configuration changes in a data processing system having a plurality of destination units, the method including the steps of providing a plurality of reference models arranged in a tree starting from a root reference model, associating each destination unit with a reference model including configuration information specific for the corresponding destination units, determining a target configuration for the destination units associated with a selected reference model according to the configuration information of the reference models in a path from the root reference model to the selected reference model, and causing each destination unit associated with the selected reference model to be updated according to the target configuration.

Moreover, the present invention also provides a computer program for performing the method, a product storing the program, and a corresponding data processing system.

Further features and the advantages of the solution according to the present invention will be made clear by the following description of a preferred embodiment thereof, given purely by way of a non-restrictive indication, with reference to the attached figures, wherein.

Figure 1:
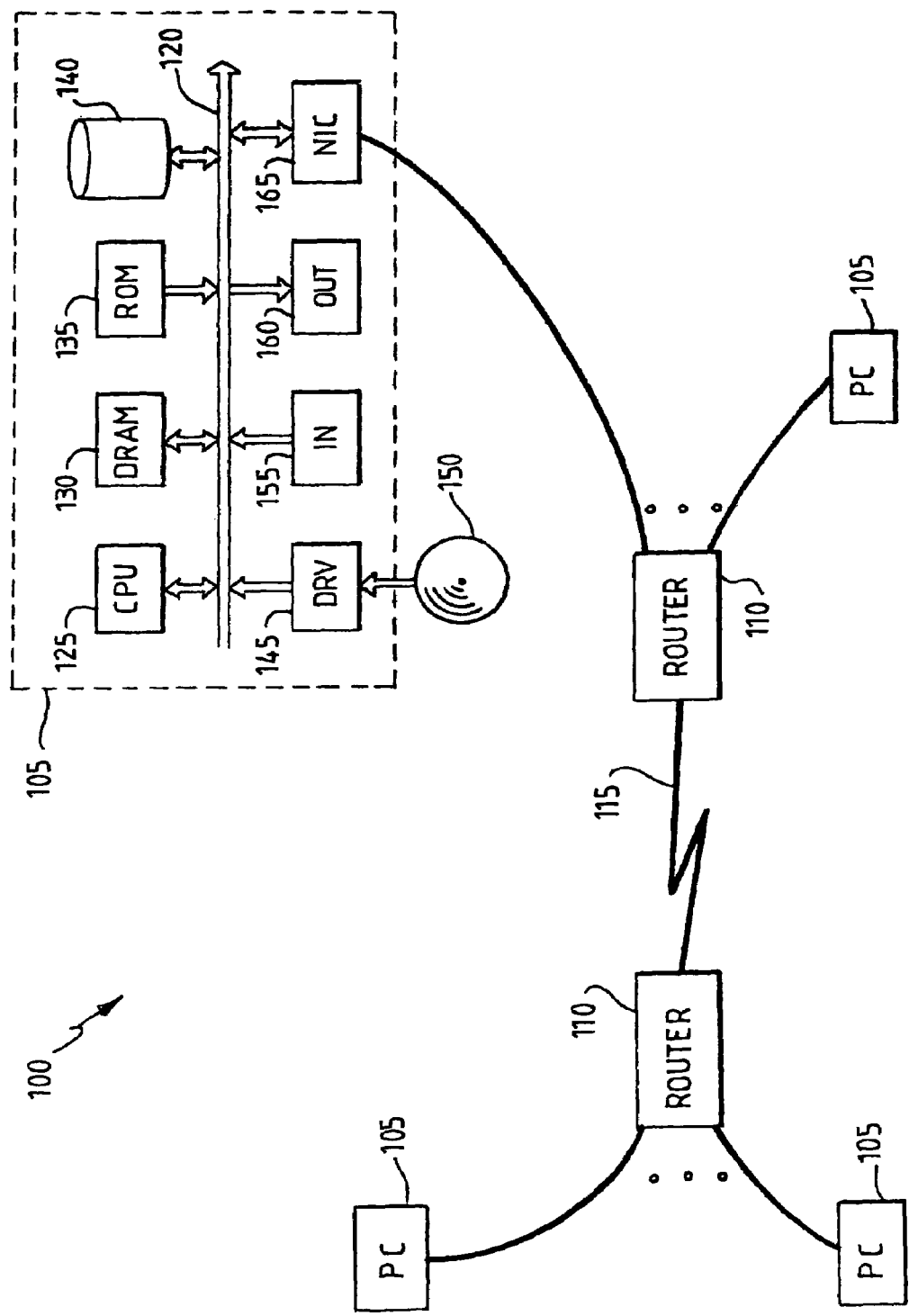
FIG. 1 is a basic block diagram of a networking system in which the method of the invention can be used.

With reference in particular to FIG. 1, there is shown a networking system 100, such as a WAN (Wide Area Network) used in a large company. The networking system 100 if formed by a plurality of workstations 105, typically consisting of PCs (Personal Computers). The workstations 105 are clustered around corresponding concentrators 110 (such as routers/hubs); the concentrators 110 are installed at distributed sites and are connectable by a telephone line 115. The networking system 100 has a client/server architecture, wherein one or more of the workstations 105 (generally consisting of powerful computers) manage network resources, such as shared files and devises; the other workstations 105 operate as clients on which end-users run applications relying on server resources.

Each workstation 105 includes several units, which are connected in parallel to a communication bus 120. In particular, a central processing unit (CPU) 125 controls operation of the workstation 105, a working memory 130 (typically a DRAM) is used directly by the CPU 125, and a read-only memory (ROM) 135 stores a basic program for starting the workstation 105. Various peripheral units are further connected to the bus 120 (by means of respective interfaces). Particularly, a bulk memory consists of a hard-disk 140 and of a driver unit (DRV) 145 for reading CD-ROMs 150; the workstation 105 further includes an input unit (IN) 155, which consists for example of a keyboard and a mouse, and an output unit (OUT) 160, which consists for example of a monitor. A network interface card (NIC) 165 is used to connect the workstation 105 to the concentrator 110.

Similar considerations apply if the networking system is associated with a department of the company (or with any other entity), if the networking system has a different topology, if the networking system consists of a LAN (Local Area Network), if the networking system includes different components (such as one or more switches), if each workstation has a different structure (for example with a multi-processor architecture), and the like.

Figure 2:
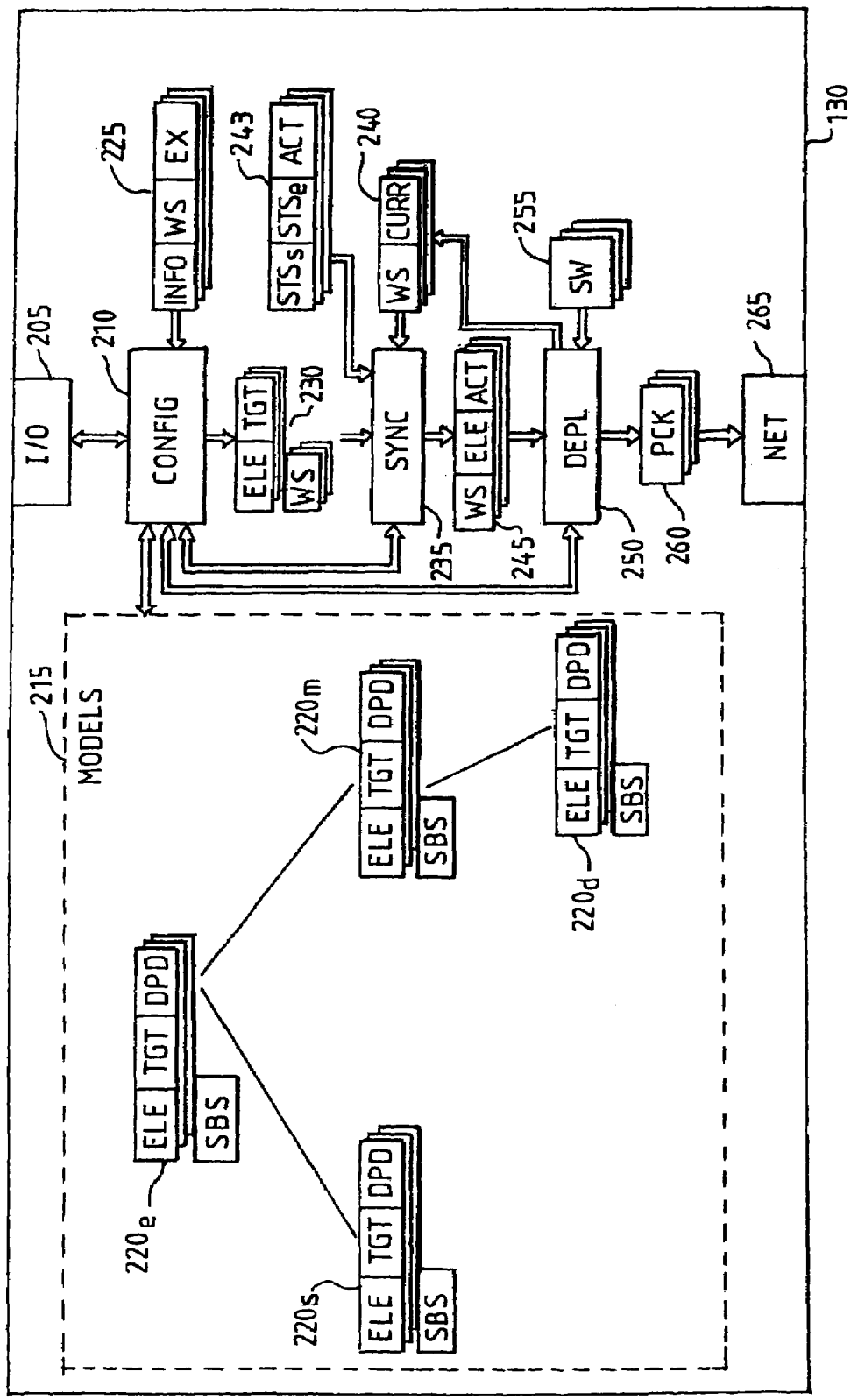
FIG. 2 shows a partial content of a working memory of a server workstation included in the networking system.

Considering now FIG. 2, there is shown a partial content of the working memory 130 of a workstation operating as a software distribution server; the information (programs and data) is typically stored on the hard-disk and loaded (at least partially) into the working memory 130 when the programs are running, together with an operating system and other application programs (not shown in the figure). The programs are initially installed onto the hard disk of the server workstation from CD-ROM.

The working memory 130 includes an input/output interface (I/O) 205 for exchanging information with the peripheral units of the server workstation. The input/output interface 205 communicates with a change configuration management module (CONFIG) 210.

The configuration module 210 controls a repository (MODELS) 215 of reference models, each one defining a profile with configuration information specific for the corresponding client workstations. In the example at issue, the repository 215 includes an enterprise model 220e, a secretary model 220s, a manager model 220m and a developer model 220d. The configuration module 215 further accesses a company database 225.

A generic reference model includes one or more records defining respective configuration elements. Each record consists of a field ELE identifying the configuration element, such as a software product or a hardware feature. A field TGT denotes a desired target status of the configuration element; for example, the target status for a software product indicates that the software product is to be installed, removed, or installed/removed in an undoable manner, while the target status for a hardware feature indicates a hard-disk size, a CPU model, or a working memory capacity. A further field DPD includes dependency information indicating logic relations between the configuration elements; for example, the filed DPD contains the configuration elements required for running a software product (pre-requisites), the configuration elements in conflict with the software product (ex-requisites), or the configuration elements to be installed in a certain order together with the software product (co-requisites).

The reference model further includes a field SBS, which is used to associate the reference model with one or more client workstations (subscribers); the association is carried out statically and/or dynamically. When the subscribers are defined statically, the field SBS simply contains a list of the client workstations; conversely, when the subscribers are defined dynamically, the field SBS contains a query to be run on the company data base 225, whose result provides the list of the client workstations.

The reference models are hierarchically arranged in a tree. Particularly, the enterprise model 220e defines a root of the tree; the secretary model 220s and the manager model 220m depend on the enterprise model 220e, and in turn the developer model 230d depends on the manager model 220m. As described in detail in the following, each child reference model 220s, 220m and 220d (which depends on a corresponding parent reference model 220e, 220e and 220m, respectively) inherits the configuration information of all the reference models in a path from the root reference model 220e to the child reference model. It should be noted that the inheritance mechanism does not implement an "is-a" semantic; for example, a developer is not a manager, but all the configuration elements (not the subscribers) belonging to the manager model 220m are inherited by the developer model 220d.

The company database 225 defines an organization chart of the company and consists of a relational table formed by a record for each employee. The record is composed of a field INFO containing information about the employee, such as his or her name, telephone and facsimile numbers, e-mail address, department, position, manager and subordinate persons (if any), and the like. A field WS identifies the client workstation assigned to the employee, for example its type, serial number, location, and IP address. A flag EX indicates that the client workstation assigned to the employee is to be excluded from the result of the query (when asserted).

The configuration module 210 generates a memory structure 230 indicating a target configuration for the client workstations associated with a selected reference model. The target configuration 230 includes one or more configuration elements, each one defined by the respective fields ELE and TGT (indicating the configuration element and its target status, respectively), and the list of the client workstations associated with the selected reference model, each one identified by the respective field WS.

The target configuration 230 is supplied to a synchronization engine (SYNC) 235, which accesses an inventory 240 storing a current configuration of the client workstations. The configuration inventory 240 includes a record for each client workstation; the record consists of the respective field WS (identifying the client workstation) and a field CURR denoting the hardware features of the client workstation and the software products installed thereon. The synchronization engine 235 further accesses a state transition table 243. The state transition table 243 consists of a lookup table, wherein each record has a key formed by a field STSs and a field STSe; the fields STSs and STSe indicate a starting status and an ending status, respectively, of a generic configuration element belonging to a corresponding category (such as hardware feature or software product). The key STSs,STSe is associated with an attribute consisting of a field ACT indicating an action to be performed for reaching the ending status STSe from the starting status STSs (for example installing a software product, removing a software product, upgrading the CPU, increasing the size of the hard-disk, and so on).

The synchronization engine 235 generates a memory structure 245 defining a list of actions to be performed on each client workstation associated with the selected reference model for reaching the target configuration. Particularly, the action list 245 includes a series of records, each one consisting of the field WS identifying the client workstation, the field ELE identifying the configuration element involved, and the field ACT indicating the corresponding action to be carried out on the client workstation.

The action list 245 is provided to a deployment agent (DEPL) 250, which accesses a repository (SW) 255 of the software products. The deployment agent 250 builds a distribution package (PCK) 260 for each client workstation; the distribution package 260 consists of one or more files containing the software products to be installed on the client workstation and instructions for automatically executing the actions (relating to software products) indicated in the corresponding records of the action list 245 (such as installing the software products included in the package or removing other software products). The deployment agent 250 further controls the updating of information stored in the configuration inventory 240.

The distribution packages 260 are provided to a network interface (NET) 265, which sends the packages to the corresponding client workstations according to a plan scheduled by the deployment agent 250. The network interface 265 is also connected to the deployment agent 250 directly for supplying messages received from the client workstations. The synchronization engine 235 and the deployment agent 250 further communicate with the configuration module 210 for receiving commands and providing return codes indicative of a result of the corresponding operations.

Similar considerations apply if the programs and data are structured in a different manner, if other modules or functions are provided, if the tree consists of a different number of reference models, if one or more of the reference models are dummy models without any subscriber associated therewith, if the company database has a different architecture and stores other information, if two or more client workstations are assigned to some employees, and the like. Alternatively, equivalent configuration information is included in the reference models, different configuration elements are managed (such as application parameters, databases, audio and video recordings, or any other digitally encoded product), different target status are supported (for example indicating that a software product must be simply disabled but not removed), or the subscribers consist of different destination units (such as software applications or profiles associated with respective users logging into the client workstations).

Figure 3A:
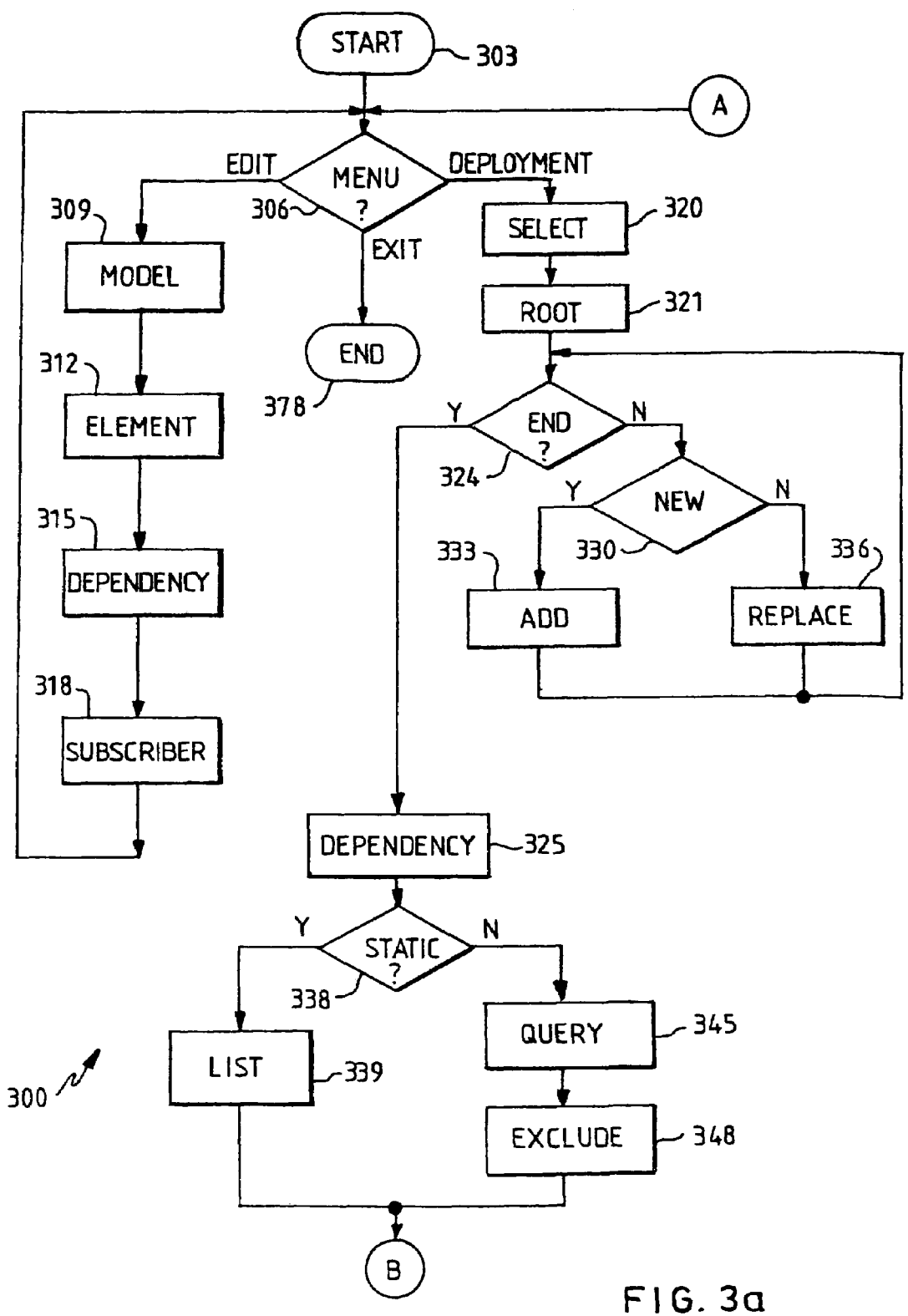
FIGS. 3a-3b are a flow chart of a method for managing configuration changes to client workstations of the networking system.
Figure 3B:
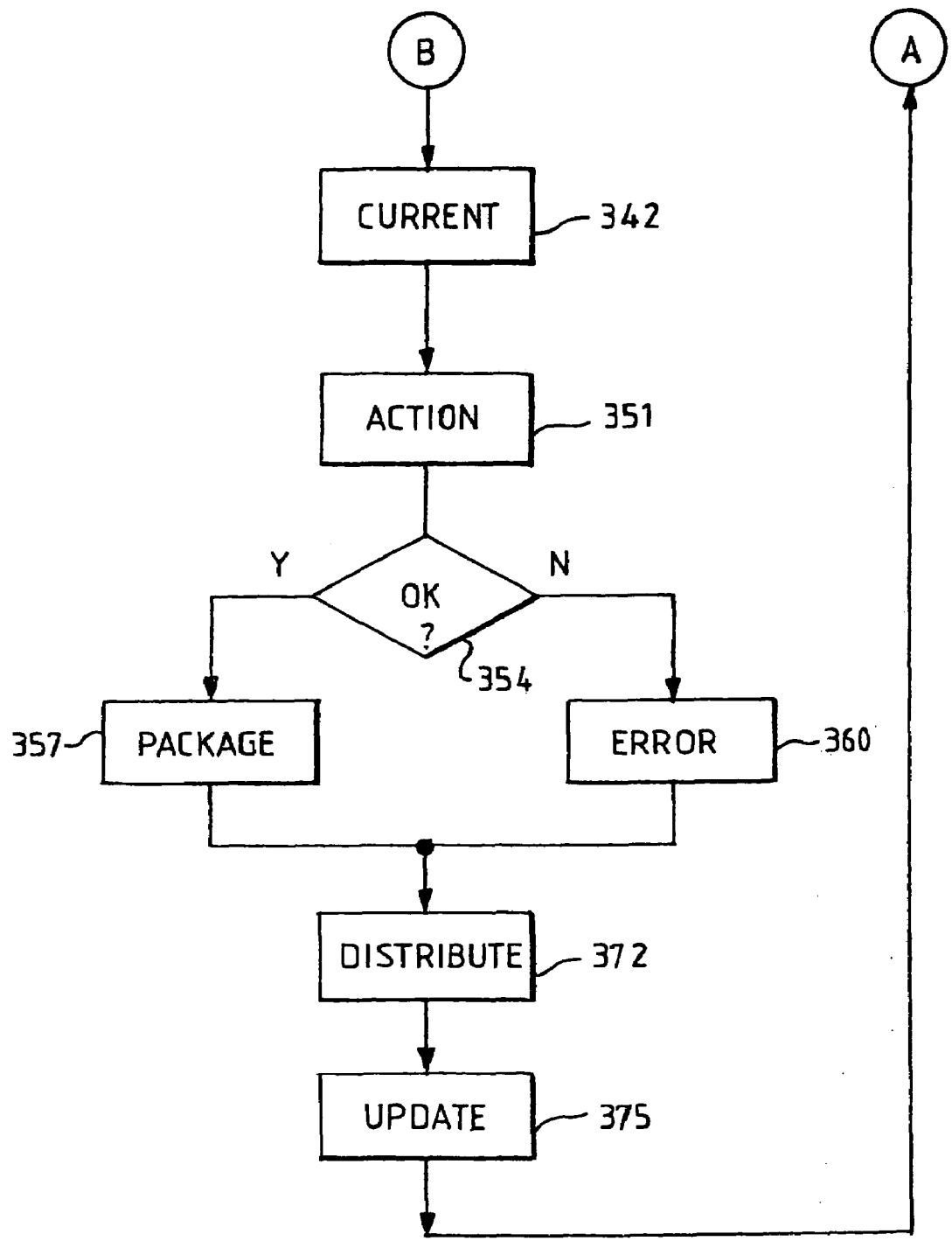

As shown in FIGS. 3a-3b, a whole software distribution application consisting of the configuration module, the synchronization engine and the deployment agent performs a method 300 when running on the server workstation. The method 300 starts at block 303 and then passes to block 306, wherein a menu with a series of possible choices is displayed to a system administrator on the monitor of the server workstation. The method executes the operations corresponding to the choice selected by the administrator. Particularly, if the administrator has selected the function of editing the reference model repository the blocks 309-318 are carried out, while if the administrator has selected the function of deploying a new configuration to the corresponding client workstations the blocks 320-375 are carried out; conversely, if the administrator has chosen to exit the software distribution application, the method ends at the final block 378.

Considering now block 309 (editing function), the administrator deletes a selected reference model (restructuring the tree accordingly), inserts a new reference model into the tree, or selects a reference model to be updated. The method continues to block 312, wherein if a reference model has been selected for updating the administrator deletes a configuration element, creates a new configuration element, or updates the target status of a selected configuration element. Passing to block 315, the administrator edits the dependency information for the selected configuration element (pre-requisites, ex-requisites or co-requisites), for example adding, updating or deleting items. With reference to block 318, the administrator modifies the subscribers assigned to the selected reference model; particularly, the identifier of a client workstation is deleted from the corresponding list, the identifier of a new client workstation is inserted, or the query dynamically defining the list of the client workstations is created or updated. The method then returns to block 306 waiting for a new command by the administrator.

Considering now block 320 (deployment function), the administrator selects one of the reference models to be enforced. The method descends into block 321, wherein all the configuration elements of the root reference model are added to the target configuration (empty at the beginning). The configuration module than checks at block 324 whether the selected reference model has been reached (and completely processed). If so, the method passes to block 325 (described in the following). On the contrary, the method proceeds to block 330, wherein a new configuration element of the reference models down the tree along a path from the root reference model to the selected reference model is considered (staring from the first configuration element in the child reference model depending from the root reference model directly). If the target configuration does not include the current configuration element, the method continues to block 333, wherein the current configuration element is added to the target configuration; conversely, the method continues to block 336, wherein the target status and the dependency information of the (previous) configuration element in the target configuration are replaced with the corresponding fields of the current configuration element. In both cases, the method returns to block 324 for processing a next configuration element of the same reference model or the first configuration element of a next reference model.

Considering now block 325, the target configuration is updated according to the corresponding dependency information, in order to resolve all the logic relations between the configuration elements. For example, configuration elements corresponding to the pre-requisite products and the co-requisite products to be installed are added, the configuration elements are rearranged for meeting the required order of installation, or configuration elements corresponding to the ex-requisite products to be removed are inserted.

The method then passes to block 338, wherein the configuration module verifies whether the subscribers are defined statically or dynamically in the selected reference model. In the first case, the list of the client workstations included in the selected reference model is added to the target configuration at block 339, and the method then descends into block 342 (described in the following). Conversely, if the subscribers are defined dynamically the corresponding query included in the selected reference model is run on the company database at block 345 in order to extract the list of the client workstations. The list is pruned at block 348 of the client workstations to be excluded from the deployment of the new configuration according to the corresponding flag. The method then passes to block 342.

Considering now block 342, the current configuration of the client workstations associated with the selected reference model is extracted from the configuration inventory. The synchronization engine then generates at block 351 the action list for each client workstation by comparing the target configuration with the corresponding current configuration. Particularly, if the current status of each configuration element (software product or hardware feature) meets the desired target status, no action is performed; conversely, the action required to reach the target status of the configuration element from its current status is extracted from the state transition table and added to the list.

The method proceeds to block 354, wherein the deployment agent verifies whether a current hardware structure of the client workstations associated with the selected reference model meets the hardware pre-requisites of the target configuration. For all the client workstations that meet the hardware pre-requisites of the target configuration, the corresponding distribution package is built at block 357; more specifically, the deployment agent inserts each software product to be installed into the distribution package, and add instructions for performing the required actions. Conversely, for all the client workstations that do not meet the hardware pre-requisites of the target configuration, for example because the CPU model cannot run the software products to be installed or the hard-disk size is insufficient, an error condition is entered at block 366; particularly, a warning is provided to the administrator and the deployment of the target configuration to these client workstations is aborted.

In both cases, the method continues to block 372, wherein the packages (if any) are sent to the respective client workstations through the network. Each package is received on the client workstation; the instructions embedded in the package are executed in order to install or remove the corresponding software products. A return code message is sent back from each client workstation to the server workstation for reporting the result of the configuration change; the deployment agent updates the configuration inventory accordingly at block 375. The method then returns to block 306 waiting for a new command by the administrator.

The following tables define an example of configuration elements belonging to each reference model:

| Field ELE | Field TGT |
|---|---|
| Enterprise model | |
| E-mail program (software program) | Installed |
| Anti-virus (software program) | Installed |
| Working memory size (hardware feature) | >=64 MB |

-continued

| Field ELE | Field TGT |
|---|---|
| Secretary model | |
| Office automation (software program) | Installed |
| Games (software program) | Not installed |
| Manager model | |
| Office automation (software program) | Installed |
| Reporting (software program) | Installed |
| Developer model | |
| Compiler (software program) | Installed |
| Reporting (software program) | Inst. undoable |
| Working memory size (hardware feature) | >=128 MB |

Let us suppose now that we want to enforce the developer model. The target configuration for the client workstations associated with the developer model is defined as:

| Field ELE | Field TGT |
|---|---|
| E-mail program (software program) | Installed |
| Anti-virus (software program) | Installed |
| Working memory size (hardware feature) | >=128 MB |
| Office automation (software program) | Installed |
| Reporting (software program) | Inst. undoable |
| Compiler (software program) | Installed |

As a consequence, if a client workstation associated with the developer model has only the anti-virus installed thereon and its working memory size is greater than 128 MB, the following list of actions is to be performed for reaching the target configuration:

| Field ELE | Field ACT |
|---|---|
| E-mail program (software program) | Install |
| Office automation (software program) | Install |
| Reporting (software program) | Install, undoable |
| Compiler (software program) | Install |

Likewise considerations apply if an equivalent method is performed, for example if report functions are provided, if the company inventory is stored elsewhere and the query is run by another workstation, and so on.

More generally, the present invention provides a method of managing configuration changes in a data processing system having a plurality of destination units. The method includes the steps of providing a plurality of reference models arranged in a tree starting from a root reference model, and associating each destination unit with a reference model including configuration information specific for the corresponding destination units; the method further includes the steps of determining a target configuration for the destination units associated with a selected reference model according to the configuration information of the reference models in a path from the root reference model to the selected reference model, and causing each destination unit associated with the selected reference model to be updated according to the target configuration.

The devised solution provides a scalable and flexible way of specifying the target configuration of each destination unit. Particularly, the reference models allow the destination units to be arranged into logical, functional groups according to the role that each destination unit plays in the system. Therefore, any profile or organisational change can be automatically reflected on the destination units involved simply modifying the corresponding reference models. In this way, a large system with a great number of destination units can be managed as a small system, by handling all the destination units associated with each reference model as a single entity.

The hierarchical structure of the reference models greatly simplifies the modeling of the destination units, by allowing a step-by-step definition of the target configuration of each destination unit; in fact, the configuration elements common to all the destination units are defined only in the root reference model, and the configuration elements specific for each functional group are defined moving down the tree. In this way, the number of reference models needed to describe the whole system is greatly reduced; moreover, each change to a reference model is automatically reflected into the target configuration of all the destination units associated with its child reference models.

The solution according to the present invention simplifies the deployment of new configurations in the system. As a consequence, the process of managing frequent configuration changes to different groups of destination units is made more reliable.

The preferred embodiment of the invention described above offers further advantages. For example, the algorithm proposed for determining the target configuration from the corresponding reference models along the path from the root reference model to the selected reference model is particular simple and effective. This solution allows any reference model to inherit all the configuration elements of the parent reference models; at the same time, each reference model can override the target status or block the installation/removal of any configuration element defined in the parent reference models.

Alternatively, the target configuration is determined in a different manner, for example without the possibility of overriding and/or blocking the configuration elements defined in the parent reference models.

The dependency information inserted in the reference models prevents definition and enforcement of incorrect configurations. In addition, the verification of the current hardware structure of each destination unit (in order to check whether it meets the hardware prerequisites of the target configuration) ensures that each destination unit is at a level allowing all the software products to be installed to run correctly.

Likewise considerations apply if the dependency information is used in a different manner for determining the target configuration, if the method only verifies compliance of the target configuration with the corresponding dependency information (without modifying the target configuration but simply entering an error condition if the result of the verification is negative), if the dependency information is not defined in the reference models but in a distinct memory structure that is accessed by the configuration module each time a reference model must be enforced, if the package is sent to the client workstations in any case (even if an error condition has been entered), and so on. However, the solution according to the present invention leads itself to be carried out even without the possibility of defining any dependency information for the configuration elements or any hardware feature in the reference models.

The dynamic definition of the subscribers associated with each reference model makes it possible to evaluate the destination units to which the configuration changes must be enforced when the new configuration is actually deployed. Moreover, the possibility of excluding some destination unit from the result of the query allows these destination units to be left temporary unchanged without modifying the field defining the subscribers in the corresponding reference model.

Alternatively, the destination units are associated with each reference model in a different manner, for example defining groups of destination units (such as the client workstations attached to a specified router), the whole result of the query is always employed (without the possibility of excluding any destination unit), the subscribers are defined only statically or dynamically, and the like.

The inventory storing the current configuration of each destination unit allows a level of the configuration elements present on the client workstations to be efficiently tracked. For example, the administrator can easily decide where to distribute a new software product already installed on a subset of the client workstations and now to be installed on all the client workstations of the system, or where to distribute a new version of a software product already installed on a subset of the client workstations.

The method described above is particularly advantageous for a software distribution application used in a large network, wherein the new configurations are automatically deployed from the server workstation to a great number of client workstations.

Similar considerations apply if the state transition table is replaced by an equivalent memory structure, or if the list of actions is determined in a different manner according to a comparison between the target configuration and the current configuration of each destination unit (for example with an algorithm embedded in the synchronization engine). However, the proposed solution leads itself to be implemented even without any configuration inventory (for example collecting the information indicative of the current configuration of each client workstation dynamically by the server workstation); moreover, the method of the invention is also suitable to be used in a different data processing system (even with the destination units not connected to each other in a network, for example copying the packages onto CD-ROMs that are manually distributed), or for controlling only hardware configurations.

Advantageously, the method proposed by the present invention is implemented with a computer program, which is provided on CD-ROM.

Alternatively, the program is provided on floppy-disk, is pre-loaded onto the hard-disk, or is stored on any other computer readable medium, is sent to the computer through the network, is broadcast, or more generally is provided in any other form directly loadable into a working memory of a computer. However, the method according to the present invention leads itself to be carried out even with a hardware structure installed on the server workstation, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of managing configuration changes in a data processing system having a plurality of destination units, the method including the steps of:
providing a plurality of reference models arranged in a tree starting from a root reference model,
associating each destination unit with a reference model including configuration information specific for the corresponding destination units, wherein the configuration information includes at least one record indicating a target status of a corresponding configuration element and wherein the tree provides dependency information indicating logic relations between the configuration elements, the target configuration being determined further according to the dependency information of the corresponding configuration elements,
determining a target configuration for the destination units associated with a selected reference model according to the configuration information of the reference models in a path from the root reference model to the selected reference model,
causing each destination unit associated with the selected reference model to be updated according to the target configuration,
providing an inventory storing an indication of a current configuration of each destination unit, and
determining a list of actions for reaching the target configuration on each destination unit associated with the selected reference model according to a comparison between the target configuration and the corresponding current configuration, wherein the configuration information includes an indication of at least one digitally encoded software application product to be installed or removed, and wherein the data processing system comprises a network with a server workstation and a plurality of client workstations each one associated with at least one destination unit, the method further including, for each destination unit associated with the selected reference model, the steps of building a package under the control of the server workstation, the package including each software application product of the target configuration to be installed and instructions for automatically executing the list of actions, distributing the package to the client workstation associated with the destination unit through the network, and updating the inventory according to the actions executed on the client workstation.

2. The method according to claim 1, wherein the step of determining the target configuration includes, for each current record of the reference models along the path:
verifying if the target configuration includes a previous record for the configuration element of the current record, and
adding the current record to the target configuration if the verification is negative or replacing the target status of the previous record with the target status of the current record if the verification is positive.

3. The method according to claim 1, wherein the configuration information includes an indication of at least one hardware pre-requisite required by the at least one digitally encoded software application product, the method further including the step of verifying whether a current hardware structure of each destination unit associated with the selected reference model meets each hardware pre-requisite of the target configuration.

4. The method according to claim 1, further including the step of running a query on a memory structure for dynamically extracting a list of the destination units associated with the selected reference model.

5. The method according to claim 4, further including the step of excluding each destination unit from the list if a corresponding exclusion flag in the memory structure is asserted, wherein the exclusion flag is associated with a given destination unit.

* * * * *